United States Patent [19]
Burdick

[11] Patent Number: 6,155,928
[45] Date of Patent: Dec. 5, 2000

[54] MODULAR PORTABLE GAMING SIMULATOR SYSTEMS AND METHODS

[75] Inventor: Andrew D. Burdick, Kennesaw, Ga.

[73] Assignee: The Coca-Cola Company, Atlanta, Ga.

[21] Appl. No.: 09/081,127

[22] Filed: May 19, 1998

[51] Int. Cl.[7] .................................................. A63F 13/00
[52] U.S. Cl. .................................................. 463/46; 463/6
[58] Field of Search .................................. 434/46, 55, 66, 434/67; 463/6, 46

[56] References Cited

U.S. PATENT DOCUMENTS

| | | |
|---|---|---|
| 3,677,192 | 7/1972 | Bateson et al. . |
| 4,030,208 | 6/1977 | Carver et al. ............................. 434/46 |
| 4,110,792 | 8/1978 | Long et al. . |
| 4,875,821 | 10/1989 | Oren . |
| 5,114,202 | 5/1992 | Johnson . |
| 5,249,833 | 10/1993 | Kobayashi . |
| 5,263,756 | 11/1993 | Gasper . |
| 5,269,687 | 12/1993 | Mott et al. . |
| 5,354,202 | 10/1994 | Moncrief et al. . |
| 5,375,899 | 12/1994 | Wright . |
| 5,398,463 | 3/1995 | Wright . |
| 5,400,551 | 3/1995 | Uhl . |
| 5,577,913 | 11/1996 | Moncrief et al. . |
| 5,595,414 | 1/1997 | Dulnig et al. . |
| 5,706,616 | 1/1998 | Fernandez . |
| 5,707,237 | 1/1998 | Takemoto et al. . |
| 5,810,596 | 9/1998 | Van Lookeren Campagne ........ 434/46 |
| 5,816,920 | 10/1998 | Hanai . |
| 5,865,624 | 2/1999 | Hayashigawa ............................. 434/66 |

FOREIGN PATENT DOCUMENTS

| | | |
|---|---|---|
| 0 836 872 | 4/1998 | European Pat. Off. . |
| 34 47 127 A1 | 7/1986 | Germany . |

OTHER PUBLICATIONS

Website material from NASCAR Silicon Motor Speedway.
Pamphlet from SPEVCO Inc.
"The Coca Cola Wall of Speed", Online, May 20, 1998, pp. 1–2, XP002112424.

*Primary Examiner*—Valencia Martin-Wallace
*Assistant Examiner*—John Paradiso
*Attorney, Agent, or Firm*—Alston & Bird LLP

[57] ABSTRACT

A modular portable gaming simulator system includes a transport trailer with at least one movable sidewall to which two or more gaming simulation stations are attached. The movable sidewall can be selectively raised and lowered between a transport or upright position for transporting the system, and a deployed or active position for displaying and operating the gaming simulation stations. The gaming simulation stations are interconnected so that the gaming simulation stations can interactively execute a software program application, such as in head-to-head competition. In the deployed position, the movable sidewall forms a stage on which the gaming simulation stations rest. In order to transport the system, the sidewall is raised into the upright or transportable position for transportation. During transportation, the gaming simulation stations remain attached to the sidewall in a horizontal, sideways position.

26 Claims, 7 Drawing Sheets

MODULAR PORTABLE GAMING SIMULATOR SYSTEMS AND METHODS

FIELD OF THE INVENTION

The present invention generally relates to the promotion of a sporting event by a sponsor such as a beverage company, and more particularly, to promotional activities utilizing portable attractions.

BACKGROUND OF THE INVENTION

As the popularity of sporting events has increased over recent years, so has corporate sponsorship. Corporate sponsorship can come in many forms such as through agreements with a league or governing body, an individual team an individual player/participant, or a particular venue. In all, the amount of money contributed by corporate sponsors to a given sport can amount to a sizable portion of total revenues of that sport. A key for any corporate sponsor, regardless of the nature of the sponsorship, is to create a link between that sport and the product or service of the corporation. The assumption is that fan loyalty will result in increased sales or revenues.

For example, in the sport of NASCAR® (National Association for Stock Car Auto Racing) Winston Cup Racing®, corporate sponsors pay large sums of money to have a corporate logo or trademark affixed to a racecar, a driver's jumpsuit, or an embankment surrounding a track. Because of the large sums of money at issue, the corporate sponsors often monitor the amount of time their logo or trademark is seen by the broadcast audience during a particular event. Each second that the sponsor's logo or trademark is visible, the more valuable the sponsorship is to the corporation. As another example, corporate sponsors may set up promotional attractions at an actual raceway to solicit public attention to their sponsorship of a driver or drivers. The promotional attraction may be as simple as a booth with free promotional giveaways, or as sophisticated as a portable stage with an interactive ride such as a gravity-free chair, large screen display (e.g., U.S. Pat. No. 4,110,792 to Long et al., U.S. Pat. No. 5,249,833 to Kobayashi, or U.S. Pat. No. 5,263,756 to Gaspar), a transportable platform bar (e.g., U.S. Pat. No. 5,595,414 to Dulnig et al.), or a cinema/pavilion (e.g., U.S. Pat. No. 5,706,616 to Fernandez or U.S. Pat. No. 5,398,463 to Wright).

A successful promotional attraction associated with NASCAR events has been a video game trailer which can be set up at different racing events. The video game trailer typically comprises a long bed trailer that includes several arcade-type play stations which are networked together. Thus, several participants such as racing fans can compete against one another in a racing video game. The play stations may include a monitor, steering wheel, pedals and racing-style seat, much like one would find associated with a racing game in a video arcade. Video game trailers such as these are designed and manufactured by SSG, Trinity, N.C., USA.

The video game utilized by the video game trailers are usually modified versions of commercially available video games such as NASCAR Racing 2 developed by Papyrus, Inc., Watertown, Mass., USA. NACSCAR Racing 2 is an advanced software application that provides a sophisticated graphics and audio interface. However, as advanced as the video game program utilized in the video game trailer may be, the driver's perception of sitting in an open room (i.e., a trailer) next to six or more other participants detracts from the desired experience of the driver feeling like he or she you are actually driving a racecar.

Efforts have been made to recreate a more realistic environment for playing software program applications. One such effort has been the construction of full-scale replica NASCAR Winston Cup racing cars of the type that are manufactured by SSG. The cars manufactured by SSG are full-scale replicas of actual Winston Cup racecars. Each car is equipped with a computer for running simulation software applications, a monitor, a steering wheel and pedals. However, these cars are stand-alone units, which to the knowledge of the present inventor have not been networked with other cars for head-to-head competition. Thus, these cars are typically only capable of providing a relatively small-scale attraction that handles a relatively small volume of patrons throughout a day.

One effort at racing multiple drivers against one another is the NASCAR Silicon Motor Speedway by LBE Technologies, Inc., Cupertino, Calif., USA. The NASCAR Silicon Motor Speedway provides simulated NASCAR racing utilizing stockcar simulators mounted to a motion platform, and three or more big screen projection screens are positioned in front of the simulators. The users may be provided with various controls such as a shifter, clutch, brake, accelerator, and steering wheel for controlling the car during an interactive race with a plurality of drivers in similar stockcar simulators. Several stockcar simulators are networked to race one another, and possibly several drone racers (ie., racecars controlled by the simulation software).

However, the stockcar simulators utilized in the NASCAR Silicon Motor Speedway are mechanically complex and bulky. The projection screens are taller than the stockcar simulators themselves, and are spaced apart from and wrapped around the stockcar simulators. In addition, each of the three or more big screens appears to have a respective projector mounted above or about the stockcar simulator. Further, the comprise a significant piece of mechanical equipment in order to be able to move the stockcar simulators in a manner that feels life-like. Therefore, the NASCAR Silicon Motor Speedway stockcar simulators do not appear to be well suited for transporting and setting up as an outdoor attraction.

Thus, a need exists for a portable promotional attraction that provides a life-like racing experience, and includes interactive racing between a plurality of drivers.

SUMMARY OF THE INVENTION

It is therefore an object of the present invention to provide a modular portable gaming simulator system suitable for use in promotional activities associated with a sport or event.

Another object of the present invention is to provide a modular portable gaming simulator system that provides interactive gaming between multiple users.

Yet another object of the present invention is to provide a modular portable gaming simulator system that is efficient in use and durable in structure.

These and other objects are of the present invention are provided for by a modular portable gaming simulator system having a transport trailer with at least one movable sidewall to which two or more gaming simulation stations are attached. The movable sidewall(s) can be selectively raised and lowered between a transport position, preferably a generally upright position, for transporting the system, and a deployed or active position for displaying and operating the gaming simulation stations. The gaming simulation stations are interconnected so that the gaming simulation stations can interactively execute a software program application, such as in head-to-head competition. In the deployed position, the movable sidewall(s) forms a stage on which the gaming simulation stations rest. Users can move onto the stage and engage the gaming simulation stations to interactively execute the software program application. In order to transport the system, the sidewall(s) is raised into the upright or transportable position for transportation. During transportation, the gaming simulation stations remain attached to the sidewall(s) in a generally horizontal, sideways position.

The trailer may include a second movable sidewall opposite the first removable sidewall, wherein one or more additional gaming simulation stations may be attached in a generally horizontal, sideways position to the second movable sidewall. The gaming simulation stations which are attached to respective sidewalls may be staggered along the longitudinal axis of the transport trailer to fit opposite each other when both sidewalls are in a transport or upright position.

Thus, the trailers advantageously perform the dual functions of a transport vehicle for moving the gaming simulation stations between events, and a stage or platform for the gaming simulation stations at each event. Further, by leaving the gaming simulation stations attached to the movable sidewalls while transporting and displaying the gaming simulation stations, the setup and breakdown of the system can be efficiently performed in a relatively short period of time.

In a preferred embodiment, two trailers are placed in an end-to-end configuration to essentially double the size of the stage and the number of gaming simulation stations provided by the system when the sidewalls are deployed. A third trailer may be utilized as a support trailer which provides, among other support services, electrical power to the gaming simulation stations. The support trailer may further provide storage for scrim panels and projection screens that comprise a backdrop to the stage formed by the two trailers. A flagman's tower may be provided adjacent to this stage, wherein an announcer positioned in the flagman's tower and may selectively control the audio that is broadcast to the audience and the video displayed on the screens. Further, a pit unit including a plurality of pit terminals may be provided, wherein each pit terminal is operatively connected to a respective gaming simulation station for making adjustments in the execution of the software program application.

In accordance with an aspect of the present invention, a modular portable gaming system may comprise a first gaming simulation station and a second gaming simulation station, wherein the first gaming simulation station and a second gaming simulation station are interconnected by a software program application so that the first and second gaming simulation stations can interactively execute the software program application. The modular portable gaming simulation system may further include a transport trailer having first and second walls, wherein a first wall is movable between a transport position and a deployed position, and wherein the first gaming simulation station is attached to the first wall of the trailer. The first wall may include an inside surface and an outside surface while in the transport position, wherein the first gaming simulation station is attached to the inside surface of the wall. In a preferred embodiment, the first gaming simulation station is configured as a racecar.

The second wall of the gaming simulator system may be movable between a transportable position and a deployed position, and wherein the second gaming simulation station is attached to the second wall of the trailer. When the first and second walls are in the deployed position, the gaming simulation stations are in an operable position, and when the first and second walls are in the transport position, the gaming simulation stations are in an inoperable position. The trailer may have a longitudinal axis, wherein the first gaming simulation station is longitudinally displaced along the longitudinal axis of the trailer in relation to second gaming simulation station. Further, a portion of the first gaming simulation station is on one side of the longitudinal axis and a remainder of the first gaming simulation station is on an opposite side of the longitudinal axis when the first and second walls are in the transport position.

When in the deployed position, the first and second walls may comprise a portion of a stage for displaying the first and second gaming simulation stations. The support trailer may be electrically coupled to the transport trailer for providing electrical power for powering the gaming simulation stations. Further, the transport trailer may include climate control means for providing climate control to the first and second gaming simulation stations. The support trailer may further include indicia for promoting a sport, an event, a consumer product, or more particularly, a beverage.

The gaming simulator system may include a pit unit that is remotely located with respect to the transport trailer, and which includes a plurality of pit terminals. Each pit terminal may be operatively connected to a respective one of the gaming simulation stations for providing user adjustments to the software program application. A public projection means may be provided for publicly presenting video signals generated by the execution of the simulation gaming program.

In accordance with another aspect of the present invention, a method of interactive gaming may comprise the step of providing a modular portable stage which includes a first configuration for transportation and a second configuration for interactive gaming, wherein the stage includes a plurality of gaming simulation stations. The method may further include the step of interactively executing a software program application at each of the gaming simulation stations. The method may further include the step of transporting the modular portable stage while in the first configuration.

A further step of the method may include providing a pit unit comprising a plurality of pit terminals, wherein each pit terminal is operatively connected to respective gaming simulation station. The step of providing a modular portable stage may include a step of longitudinally displacing the gaming simulation stations along a longitudinal axis of the modular portable stage.

In accordance with another aspect of the present invention, a modular portable gaming stage may include a first stage portion including at least one gaming simulation station, a second stage portion which is movably connected to the first stage portion, and which includes at least a second gaming simulation station, and a software program application that can be interactively executed by at least the first and second gaming simulation stations. The modular portable gaming stage may be coupled to a second modular portable gaming stage, wherein the second modular portable gaming stage includes at least a third gaming simulation station which interactively executes the software application program. In a preferred embodiment, at least the first gaming simulation station is configured as a traction vehicle.

Other features and advantages of the present invention will become apparent to one that is skilled in the art upon examination of the following drawings and detailed description. It is intended that all such additional features and advantages be included herein within the scope of the present invention, as defined in the appended claims.

BRIEF DESCRIPTION OF THE DRAWINGS

The present invention can be better understood with reference to the following drawings. The elements of the drawings are not necessary to scale, emphasis instead being place upon clearly illustrating the principles of the present invention. Furthermore, like reference numerals designate corresponding parts throughout the several views.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that the disclosure will be thorough and complete, and will fully convey the scope of the invention to those skilled in the art.

The following description is in the best contemplated mode of carrying out the present invention. These systems and methods of the present invention have practical application in promotional activities conducted in conjunction with a sporting or commercial event. Specifically, the present invention can be embodied in a modular portable promotional attraction suited for promoting a sporting event by sponsor. To that extent, a preferred embodiment is disclosed wherein the sporting event is auto racing. However, upon reading of the present disclosure it will be recognized by those skilled in the art that the present invention may be implemented in connection with numerous other sporting events.

Figure 1A:
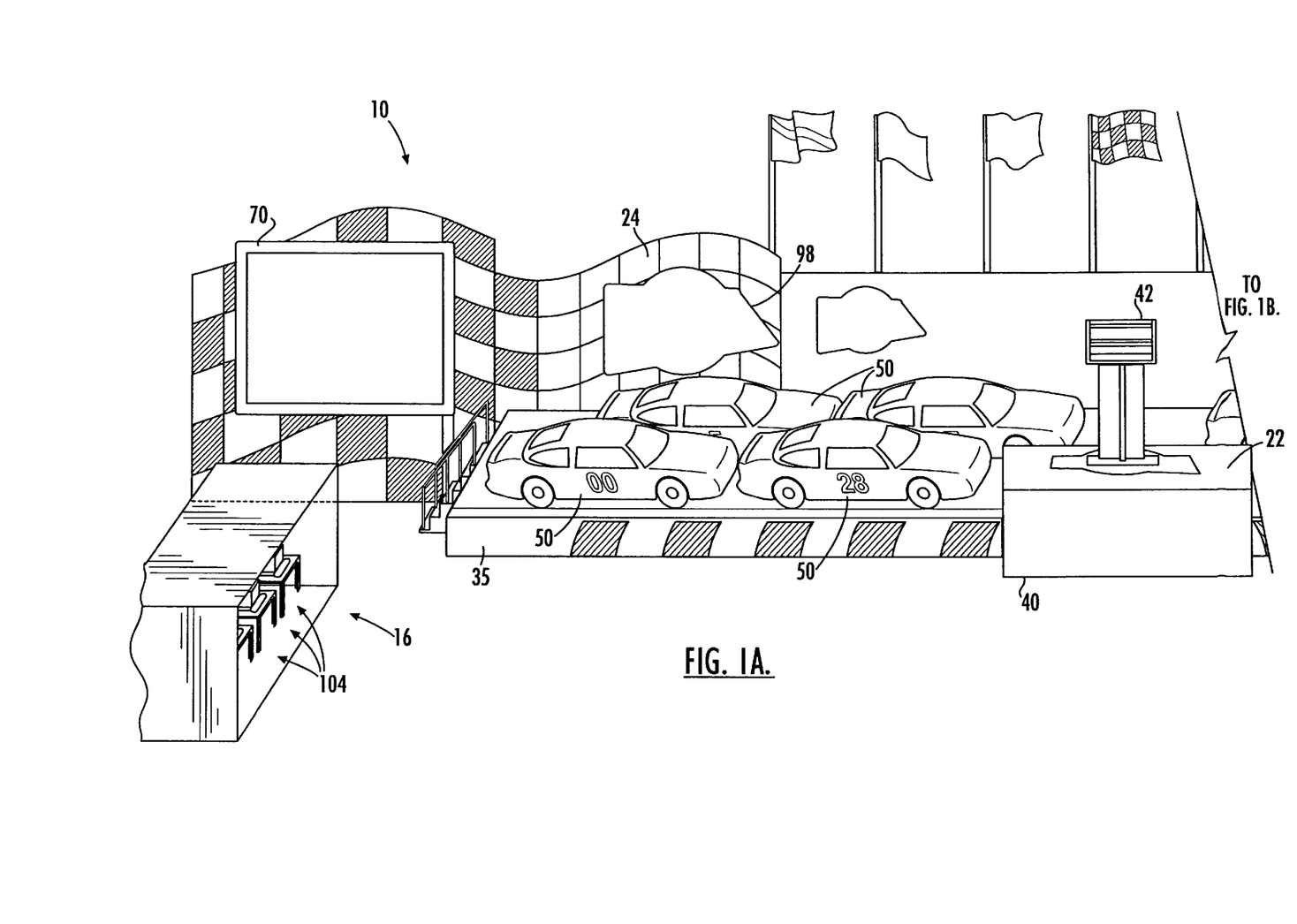
FIGS. 1A and 1B provide a system diagram of a modular portable gaming simulator system in accordance with the present invention.
Figure 1B:
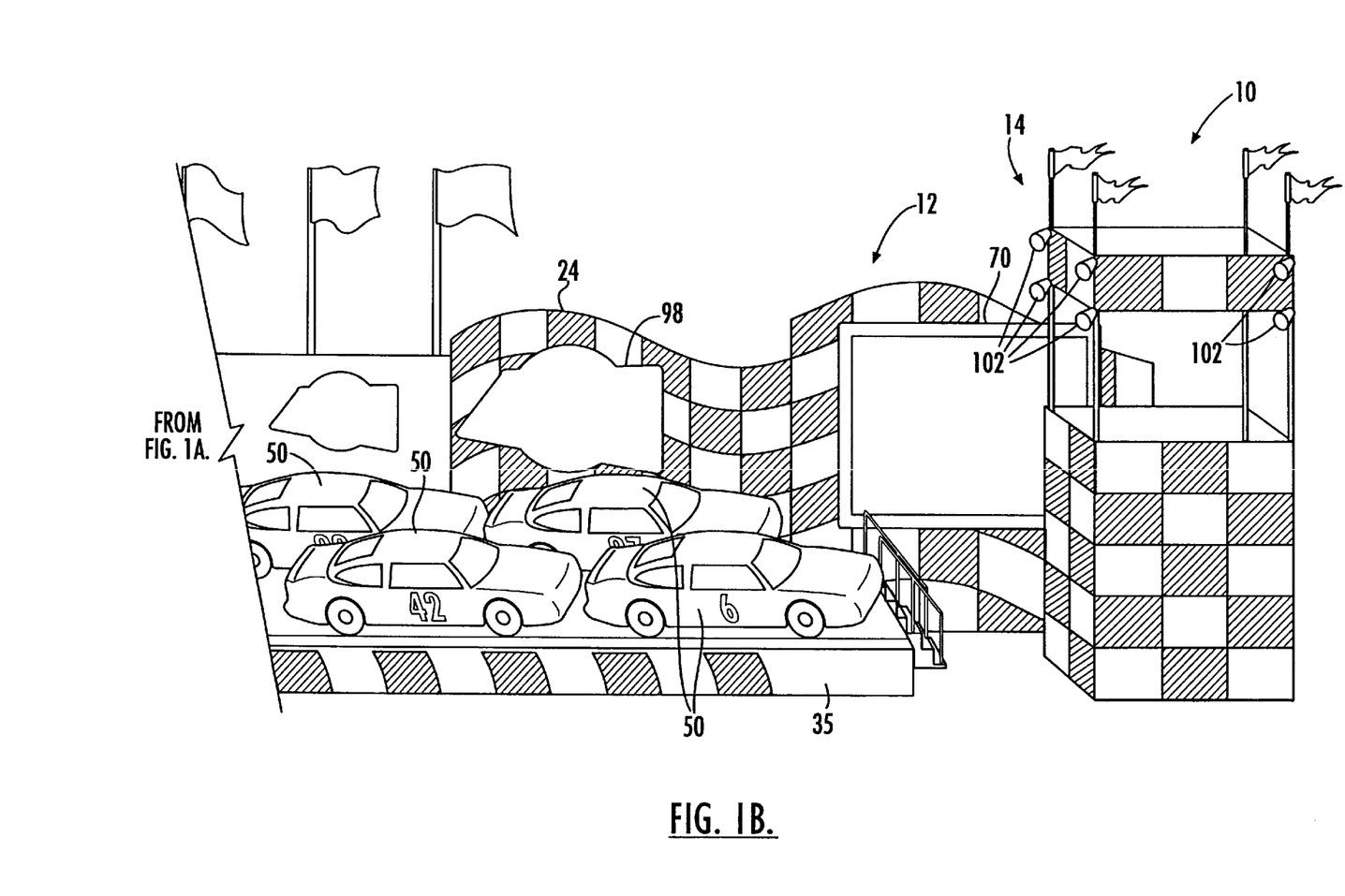
Figure 2:
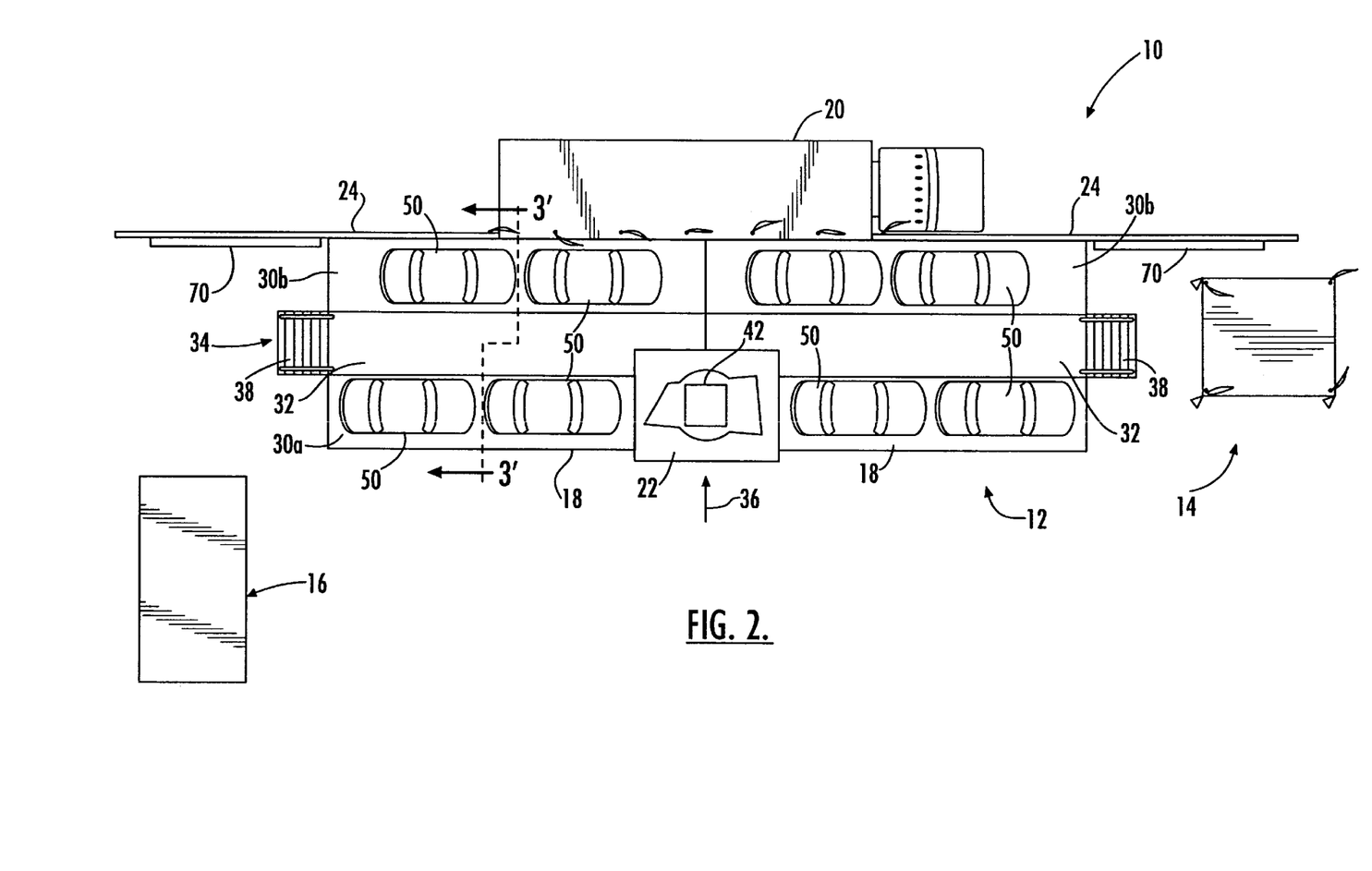
FIG. 2 is a top plan view of the system illustrated in FIGS. 1A and 1B.

As generally illustrated FIGS. 1A, 1B and 2, a modular portable gaming simulator system 10 comprises a modular stage 12, a flagman's tower 14, and a pit unit 16. The modular stage 12 includes two transport trailers 18, support trailer 20, winner's platform 22, and scrim panels 24.

The transport trailers 18 are preferably 43 foot air-ride trailers configured in an end-to-end relationship. It should be noted, however, that the gaming simulator system 10 may be configured to comprise a single transport trailer 18 of various sizes and shapes, as may be desired for certain types or sizes of events. The sidewalls 30a, 30b of the trailers 18 are pivotally attached to the trailer beds 32 so that the sidewalls can be selectively actuated between an upright or transport position and a lowered or deployed position. The sidewalls 30a, 30b may be actuated by any suitable means such as hydraulic pistons or electric winches. Trailers with movable sidewalls, such as described herein, can be designed and fabricated by custom builders such as Spevco, Inc., in Pfafftown, N.C., USA.

Figures 3, 7:
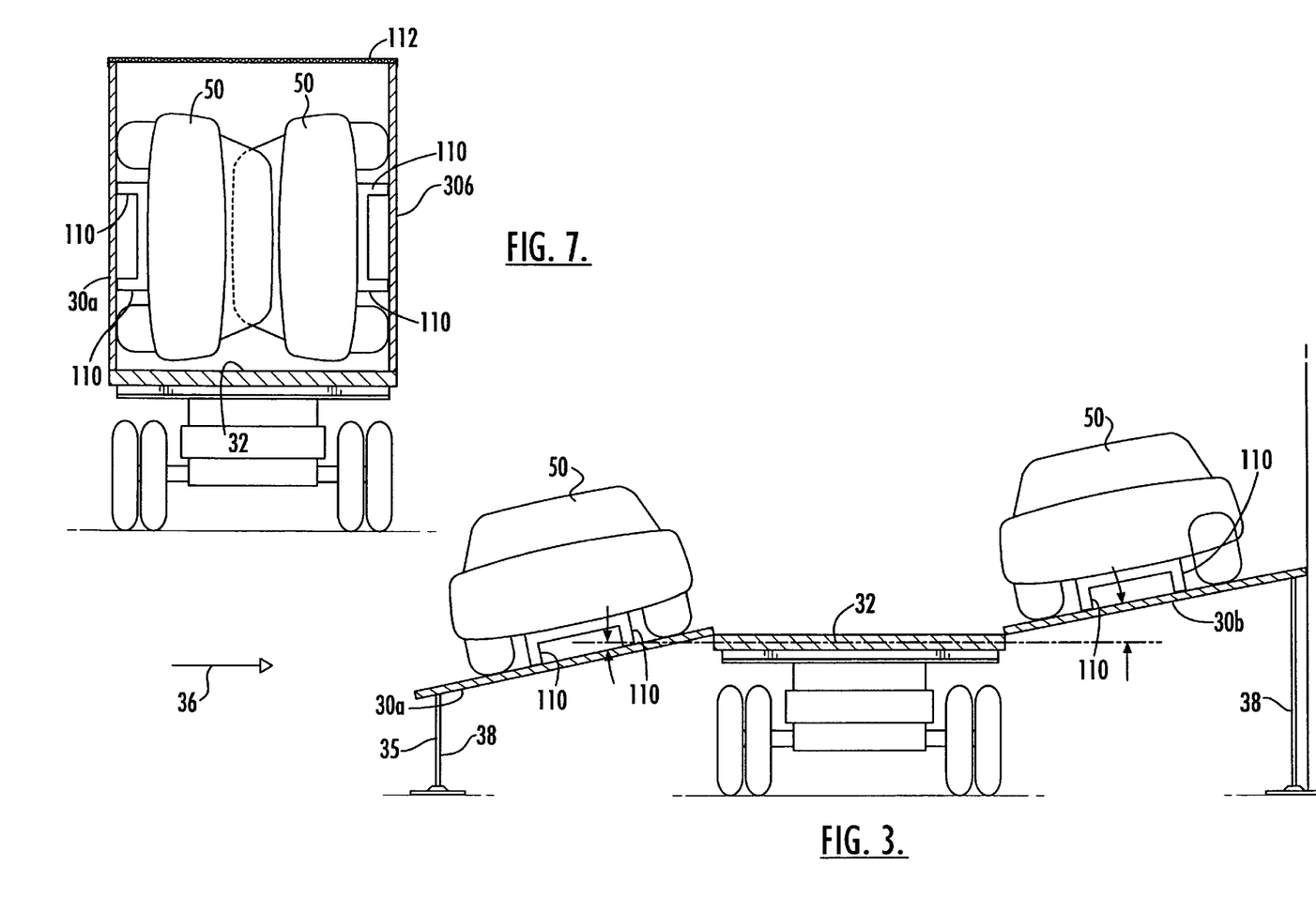
FIG. 3 is a cross-sectional view of a transport trailer taken along lines 3'—3' of FIG. 2.
FIG. 7 is a left side view of the transport trailer of FIG. 6 without a rear covering.

The sidewalls 30a, 30b are lowered in the deployed position in FIGS. 1A, 1B, and 2 so as to form an elongated platform 34 that is substantially planar. A skirt 35 may be draped around the lower portion of the stage 12 for aesthetics appeal, as is commonly done with stage structures. The opposing sidewalls 30a, 30b of the respective trailers 18 may be pitched or tilted in opposite directions off of a horizontal axis defined by the respective trailer beds 32 in order to increase the visible portions of the platform 34, as generally viewed from the audience viewpoints 36, as indicated in FIG. 2. The pitch of the sidewalls 30a is preferably downward, and the pitch of the sidewalls 30b is preferably upward, as best seen in FIG. 3. In a preferred embodiment of the present invention, the pitch of the sidewalls 30a, 30b is approximately 12°. The pitch of the sidewalls 30a, 30b further provides the effect of a banked curve or turn of a racetrack, wherein the platform 34 appears laterally tilted inward toward the audience viewpoints 36. Thus, the tilt of the platform 34 gives the stage 12 a more life-like appearance of a racetrack. With further reference to FIG. 3 it is noted that support legs 38 are provided at the distal edge of the sidewalls 30a, 30b to provide added support when the sidewalls 30a, 30b are in the lower or deployed position.

At either end of the stage 12 are steps 38, adjacent to the respective trailer beds 32 for allowing access to platform 34. Though not shown, a wheelchair access ramp or other handicap access means may also be provided to allow access to platform 34.

The winner's platform 22 partially rests on the platform 34, and extends outward towards the audience and away from the support trailer 20, as illustrated in FIG. 2. The winner's platform 22 can be made out of steel scaffolding for simple and quick assembly, as is appreciated by those skilled in the art. A skirt 40 may be draped around the lower portion of the winner's platform 22 for aesthetic appeal. A podium 42 is provided on the winner's platform 22 for presentations, announcements, etc. The winner's platform 22 may be accessed from platform 34 by stepping up from the platform 34. Steps or a ramp may be provided from the platform 34 to the winner's platform 22 if needed to enable access to the winner's platform 22.

The gaming simulation stations 50 are mounted to the sidewalls 30a, 30b in a staggered configuration as shown throughout the figures. For purposes of the present disclosure, the gaming simulation stations 50 are full-size replicas of NASCAR stockcars, though other configurations of the gaming simulation stations 50 are also within the scope of the present invention, and may include but are not limited to jet-skis, motorcycles, or Indy car racecars. Further, the gaming simulation stations 50 may be mounted to other walls of the trailer such as the trailer beds 32.

The gaming simulation stations 50 are computer-based units which can be networked together to interactively execute a computer-based video game (ie., a software program application) such as NASCAR Racing 2 developed by Papyrus, Watertown, Mass., USA. Further, with reference to FIG. 4, a gaming simulation station 50 in accordance with the present invention is illustrated. The gaming simulation station 50 is a fully detailed NASCAR stockcar replica built to actual standards. In order to facilitate ingress and egress of a driver, the driver-side door is removed. In addition, the driver seat 52 is modified to be able to slide back and forth to accommodate drivers of varying size. A computer 54 is provided for the execution of the computer-based video game. Computer 54 preferably includes a 233 megahertz (MHz) or faster Pentium® (a trademark of Intel Corp.) processor, a video board with 4 megabytes (MB) of random access memory (RAM), and a 16 bit sound card, all which are well known in the industry, and commercially available. It is noted, however, that the system requirements for computer 54 may vary depending on, among other things, the video game utilized.

Figure 4:
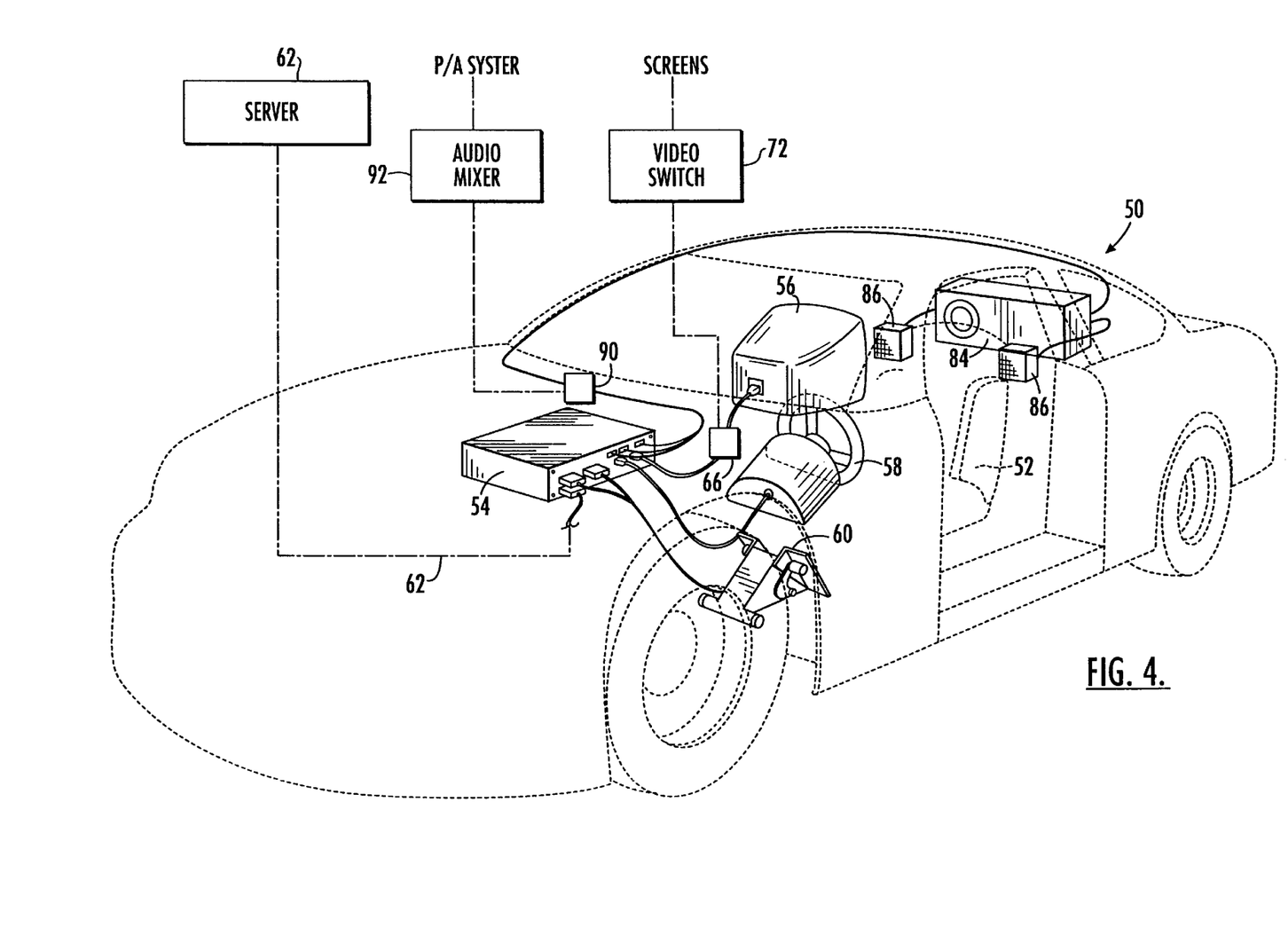
FIG. 4 is a schematic diagram of a gaming simulation station of FIGS. 1A and 1B outlined in phantom line, wherein various functional components of the gaming simulation station are illustrated.
Figure 5:
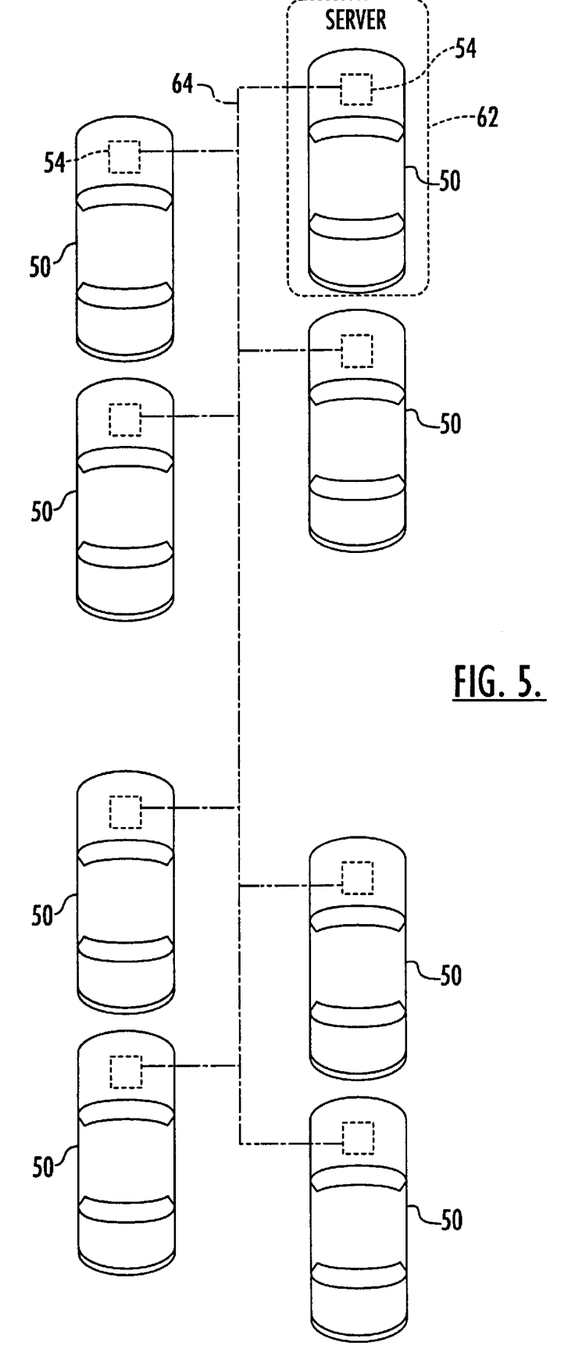
FIG. 5 is a schematic illustration of the interconnectivity of the gaming simulation stations of FIGS. 1A and 1B which provides for interactive execution of a software program application.

In the preferred embodiment, the video game program executed by the gaming simulation stations 50 is NASCAR Racing 2. The gaming simulation stations 50 are networked to one another by a server 62 via a system interface 64, as illustrated in FIGS. 4 and 5. As specifically illustrated in FIG. 5, the server 62 can be one of the computers 54 associated with one of the gaming simulation stations 50. For instance, NASCAR Racing 2 provides for the designation of a computer as the server 62 when two or more computers 54 are interconnected for head-to-head competition. In such a configuration as depicted in FIG. 5, each of the non-server computers 54 passes status data to the computer 54 of the server 62 on an essentially real-time basis. The server 62 then resends the status data to each of the other non-server computers 54 associated with the respective gaming simulation stations 50. Thus, each gaming simulation station 50 is provided with essential real-time data regarding each of the other gaming simulation stations 50 so as to provide simultaneous interactive execution of the video game.

To facilitate the execution of the video game, the gaming simulation stations 50 are provided with a monitor 56, a steering wheel assembly 58, and a pedal assembly 60 which interfacing with the respective computers 54. In a preferred embodiment, the monitor 56 is a 19 inch SVGA monitor, model no. WGM 1930-M2TS42E by Wells-Gardner, Chicago, Ill., USA, with a low profile cabinet so that the monitor 56 fits between the dashboard and the front windshield of the gaming simulation station 50, as illustrated in FIG. 4. Though only one monitor 56 is illustrated in FIG. 4, it is within the scope of this invention to provide multiple monitors or displays in order to enhance the life-like experience of the gaming simulation station 50. To that extent, other display types such as flat panel or virtual reality helmets could be utilized.

It is noted that the video signal from the computer 54 is initially sent to a video splitter 66 that has two outputs. A suitable video splitter is model P2DA4 by Extron, Anaheim, Calif., USA. A first output of the video splitter 66 is merely the input signal passed through for use by the monitor 56. The second output of the video splitter 66 is for use with a projection system for displaying on screens 70 (FIGS. 1A, 1B and 2) of the scrim panels 24, as discussed in greater detail below. If need be, the second output video signal may be converted into a format suitable for a use with the projection system. For instance, a typical video format for use with the projection system is NTSC (National Television System Committee) in the U.S., or alternatively, PAL (Phase Alternating Line) in Europe. A suitable video converter is model RGB109 by Extron. The second output video signals from each of the gaming simulation stations 50 is sent to a video switch 72, such as model SW6VGA by Extron, that may control which video signal is sent to the respective display screens 70.

The steering assembly 58 and pedal assembly 60 provide input signals from the driver to the computer 54 during execution of the video game in order to provide a life-like driving experience. The steering assembly 58 and pedal assembly 60 can be purchased from Extreme Competition Control of Minneapolis, Minn. USA. The video game should be configured to allow the user to select inputs via the steering wheel assembly 58 and/or the pedal assembly 60. For example, the tradeshow version of NASCAR Racing 2 allows the driver to initialize and control the execution of the video game program by depressing the pedals of the pedal assembly 60 and by turning the steering wheel of the steering wheel assembly 58.

In addition, an audio system is preferably provided to play the various sounds from the execution of the video game by each gaming simulation station 50. For example, a sub-woofer 84 and two satellite speakers 86 provide the audio generated by the video game via the sound card associated with the computer 54. An exemplary audio system may comprise a 50 ampere sub-woofer 84 and two 5 inch satellite speakers 86, such as is available from Cambridge Soundworks, Newton, Mass., USA. It is noted that the audio signals from the sound card of the computer 54 are spliced by an audio signal splicer 90 into two substantially identical output signals. One output signal is sent to the sub-woofer 84, which in turn drives the two satellite speakers 86, for playing the video game audio to the driver inside the gaming simulation station 50. The second output signal is sent to a multi-channel audio mixing board 92, such as model Folio by Sound Craft, a division of Harman Kardan, Nashville, Tenn., USA. The audio mixing board 92 is configured to receive audio signals from each of the gaming simulation stations 50, from an announcer's microphone, from an audio playback device (e.g., cassette or compact disc player), and/or from any other source as may be desired. The output signal from the audio mixing board 92 is broadcast over a public audio system, as is well known to those in the art. It may even be desirable, but not necessary, that one or more of the input audio signals to the audio mixing board 92 or the output signal from the audio mixing board 92 be passed through an audio equalizer to improve sound quality.

With reference back to FIGS. 1A, 1B and 2, the support trailer 20 and scrim panels 24 comprise at least a portion of the backdrop of the stage 12. In a preferred embodiment, the support trailer 20 is a Featherlight customized air-ride trailer with indicia painted or affixed to an outside surface of a sidewall for viewing from the audience viewpoints 36. The indicia may include a logo or trademark of a sponsor for establishing fan loyalty between the sponsor in the sport or event being promoted. The trailer 20 stores various components of the stage 12 and flagman's tower 14 during transportation between events. Further, at those events in which a pit unit 16 is provided, the support trailer 20 may likewise provide storage for the components of the pit unit 16. For example, the winner's platform 22, stairs 38, skirting 35, 40, and scrim panels 24 may be taken apart and efficiently stored in the support trailer 20 between uses.

In addition, the support trailer 20 may include climate control means for controlling the climate within the gaming simulation stations 50, such as by providing heating and cooling thereto. For instance, the support trailer 20 may include a portable air-conditioning unit such as model 20 HFU-1 by Spot Coolers, Boca Raton, Fla., USA. The cooled air generated by such an air-conditioning unit can be directed to each of the gaming simulation stations 50 by ductwork passing underneath the stage 12, and up through the platform 34, and into the respective gaming simulation stations 50. The support trailer 20 may also include an electrical generator such as a 60 kilowatt diesel generator, such as manufactured by Crawford, for providing electrical power for running the air-conditioning unit in the support trailer 20, and for powering gaming simulation stations 50, including the public audio and visual equipment.

Further, the support trailer 20 may include communication equipment for connecting the gaming simulation stations 50 to a public switch telephone network (PSTN) for interactive execution of the video game with the remotely located online users. For example, a broadband satellite system link may provide uplink and downlink connectivity with low latency (especially low earth orbit systems which have a sub 0.03 second round-trip time). Such a system would also accommodate the mobility of the system 10. Examples of suitable satellite systems may include Celestri by Motorola, Chandler, Ariz., USA, and Cyberstar by Loral, Palo Alto, Calif., USA. The support trailer 20 may also include various elements of the public audio and visual system, which may include a video switch 72 or audio mixer for the mixing board 92.

The scrim panels 24 are positioned behind the platform 34 adjacent to opposite ends of the support trailer 20, as shown in FIG. 2. The scrim panels 24 are preferably trussed fabric panels with indicia 98 silk-screened or painted thereon so as to be visible from the audience viewpoints 36. The scrim panels 24 may be rectangular, triangular, or virtually any regular or non-regular shape as may be desired. One or more display means such as projection screens 70 may be integrated into the scrim panels 24 for displaying video and/or still images to the audience. A projector, such as Model 335 by Hughes JVC, Livonia, Mich., USA, can be used to project images on the projection screen 70 for display. The images displayed may include prerecorded video, live video, scenes from the execution of the video game, or still images.

The flagman's tower 14 is provided to enhance the realistic appearance of the gaming simulator system 10. From the flagman's tower 14, an announcer can call the race between the gaming simulation stations 50. The announcer may be provided with a monitor for selectively viewing the video signals from each of the respective gaming simulation stations 50 via the video switch 72. Preferably, the announcer has control over the video switch 72, which also feeds the projection screens 70, in order to selectively determine which views are displayed on projection screens 70. Further, using a microphone, or other public address mechanism, such as a wireless microphone, the announcer can announce the race over the public audio system via the audio mixing board 92. The public audio system may further comprise one or more speakers 102 mounted to the flagman's tower 14, though it is recognized that audio speakers and suitable amplifiers of varying size and power can be utilized to provide desired sound effects. Accordingly, the announcer may be given control over the audio mixing board 92 so the announcer can selectively determine what is played over the public audio system.

The pit unit 16 may comprise one or more computer-based pit terminals 104. Each one of the pit terminals 104 preferably corresponds to one of the respective gaming simulation stations 50, so that a teammate of a driver of one of a gaming simulation station 50 may utilize the pit terminal 104 to provide adjustments to the execution of the video game. For example, in NASCAR Racing 2, a driver in one of the gaming simulation stations may have a teammate operating at one of the pit terminals 104 that adjusts various performance-controlling features of the virtual racecar that the driver is racing within the context of an execution of the video game. Accordingly, a greater number of patrons are able to participate in the real-life experience provided by the gaming simulator system 10.

Figure 6:
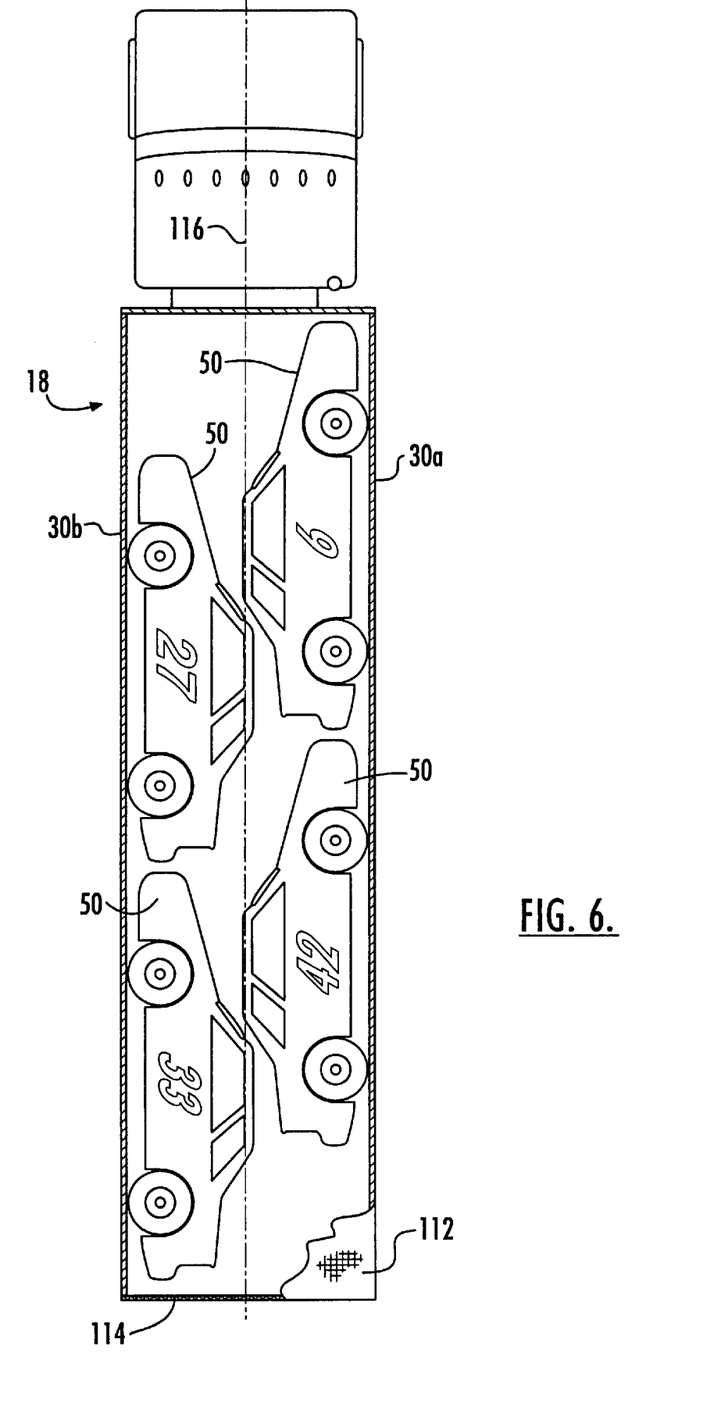
FIG. 6 is a top plan view of a transport trailer of FIGS. 1A and 1B with the trailer sidewalls in an upright or transport position.

With a reference to FIGS. 6 and 7, a transport trailer 18 is shown with sidewalls 30a and 30b in an upright or transport position. The gaming simulation stations 50 are held in place by mounting means 110, as illustrated in FIGS. 3 and 7. In a preferred embodiment, the mounting means 110 comprise a front bracket and a rear bracket. Both brackets are of steel construction and are welded to the respective sidewalls 30a, 30b. The front and rear brackets can then be bolted to the axle frame of each gaming simulation stations 50. As discussed above, the sidewalls 30a, 30b may be actuated from a transport or upright position as shown in FIGS. 6 and 7, to a deployed or lowered position as in FIGS. 1A and 1B, 2 and 3. Accordingly, the sidewalls 30a, 30b can be raised into the transport position and transported to another location efficiently and with relative ease. A top cover 112 made of canvas or other similar materials may be disposed across the top of the transport trailer 18 during transport in order to increase the aerodynamics of the transport trailer 18 and to protect the contents of the trailer 18. A rear covering 114 may be utilized at the rear of the transport trailer 18 to span between opposing edges of sidewalls 30a, 30b in order to seal and protect the contents of transport trailer 18.

As illustrated in FIGS. 6 and 7, when four gaming simulation stations 50 are mounted in a single transport trailer 18, the gaming simulation stations 50 are preferably mounted to the sidewalls 30a, 30b so that the gaming simulation stations 50 are longitudinally displaced along a longitudinal axis 116 of the transport trailer 18. Accordingly, the gaming simulation stations 50 are staggered so as to be in a roof-to-trunk and/or a roof-to-hood relationship with the gaming simulation stations 50 mounted to the opposite sidewall.

Accordingly, the gaming simulation stations 50 can be efficiently stored in a transport trailer 18 in a configuration that facilitates rapid deployment of the gaming simulator system 10 because, among other things, the gaming simulation station 50 stays mounted to the sidewalls 30a, 30b when being transported and when deployed. Therefore, once the sidewalls 30a, 30b are lowered to their deployed or active position, the gaming simulation stations are already in a display position. This is also advantageous because it reduces the number of support vehicles needed to transport the gaming simulator system 18, since a transport trailer 18 serves the dual functions of transporting the gaming simulation stations 50 and forming platform 34 for displaying the gaming simulation stations 50.

In the drawings and specification, there have been disclosed typical preferred embodiments of the invention and, although specific terms are employed, are used in a generic and descriptive sense only and not for purposes of limitation. The scope of the invention being set forth in the following claims.

Wherefore, the following is claimed:

1. A modular, portable gaming simulator system, comprising:

a first gaming simulation station and a second gaming simulation station, wherein said first gaming simulation station and said second gaming simulation station are interconnected by a gaming program application so that said first and second gaming simulation stations can interactively execute said gaming program application; and a transport trailer having opposed first and second walls, wherein said first wall is moveable between a transport position and a deployed position, and wherein said first gaming simulation station is attached to said first wall of said trailer.

2. The gaming simulator system of claim 1, wherein said first gaming simulation station is configured as a racecar.

3. The gaming simulator system of claim 1, wherein said first wall includes an inside surface and an outside surface when in said transport position, and wherein said first gaming simulator station is attached to said inside surface of said wall.

4. The gaming simulator system of claim 3, wherein said first gaming simulator stations is attached to said first wall such that when said first wall is in said deployed position then said first gaming simulation station is in an operable position, and when said first wall is in said transport position then said first gaming simulations station is in an inoperable position.

5. The gaming simulator system of claim 1, wherein said second wall is moveable between a transport position and a deployed position, and wherein said second gaming simulation station is attached to said second wall of said transport trailer.

6. The gaming simulator system of claim 5, wherein said transport trailer has a longitudinal axis, and wherein said first gaming simulation station is longitudinally displaced along said longitudinal axis of said transport trailer in relation to said second gaming simulation station.

7. The gaming simulator system of claim 6, wherein a portion of said first gaming simulation station is on one side of said longitudinal axis and a remainder of said first gaming simulation station is on an opposite side of said longitudinal axis when said first and second walls are in said transport position.

8. The gaming simulator system of claim 1, further comprising a support trailer which can be electrically coupled to said transport trailer for providing electrical power to said transport trailer.

9. The gaming simulator system of claim 8, wherein said support trailer includes climate control means for providing individual climate control for each of said first and second gaming simulation stations.

10. The gaming simulator system of claim 8, wherein said support trailer includes indicia for promoting one selected from the group consisting of a sport and a consumer product.

11. The gaming simulator system of claim 1, wherein transport trailer is configured to transport at least four gaming simulation stations.

12. The gaming simulator system of claim 1, further comprising a pit unit remotely located with respect to said transport trailer and including a plurality of pit terminals, wherein each pit terminal is operatively connected to a respective one of said gaming simulation stations for providing user adjustments to said gaming program application.

13. The gaming simulator system of claim 1, further comprising public projection means for publicly presenting video signals generated by the execution of said gaming program application.

14. A method of interactive gaming, comprising the steps of:

providing a modular, portable stage which includes a first configuration for transportation and a second configuration for interactive gaming, wherein the stage includes a plurality of gaming simulation stations attached to the stage in the first and second configurations; and interactively executing a gaming program application at each of said gaming simulation stations.

15. The interactive gaming method of claim 14, further including the step of transporting the modular portable stage while in the first configuration prior to said step of interactively executing a gaming program application.

16. The interactive gaming method of claim 14, further including the step of interfacing the gaming program application to a public communication network to allow interactive gaming over the public communication network.

17. The interactive gaming method of claim 14, further including the step of providing a pit unit comprising a plurality of pit terminals, wherein each pit terminal is associated with a respective gaming simulation station.

18. The interactive gaming method of claim 14, further comprising the step of powering the modular portable stage by a support vehicle which provides electrical power.

19. The interactive gaming method of claim 14, wherein said step of providing a modular, portable stage which includes a first configuration for transportation includes the step of longitudinally displacing the gaming simulation stations along a longitudinal axis of the modular, portable stage.

20. A modular, portable gaming stage, comprising:

a first stage portion including at least a first gaming simulation station;

a second stage portion which is movably connected to said first stage portion, and which includes at least a second gaming simulation station; and a gaming program application that can be interactively executed by at least said first and second gaming simulation stations.

21. The modular, portable gaming stage of claim 20, further comprising a third stage portion disposed between said first and second stage portions, wherein said first and second stage portions are pivotally attached to said third stage portion.

22. The modular, portable gaming stage of claim 21, wherein said first stage portion is angled upward with respect to said third stage portion, and said second stage portion is angled downward with respect to said third stage portion, whereby said gaming stage can create an appearance of a banked turn in a racetrack.

23. The modular, portable gaming stage of claim 20, further comprising a second modular, portable gaming stage coupled to said modular, portable gaming stage, wherein said second modular, portable gaming stage includes at least a third gaming simulation station which interactively executes said gaming program application.

24. The modular, portable gaming stage of claim 20, wherein said first gaming simulation station is configured as a traction vehicle.

25. The modular, portable gaming stage of claim 24, wherein said traction vehicle is configured as a racecar.

26. The modular, portable gaming stage of claim 20, further comprising a support trailer which stores goods for said gaming stage, and which operates as a backdrop to said gaming stage.

* * * * *